US006439907B1

United States Patent
Rowe

(10) Patent No.: US 6,439,907 B1
(45) Date of Patent: Aug. 27, 2002

(54) GENERATOR JUNCTION ASSEMBLY

(75) Inventor: Charles M. Rowe, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 5 days.

(21) Appl. No.: 09/910,218

(22) Filed: Jul. 20, 2001

(51) Int. Cl.[7] .............................................. H01K 4/60
(52) U.S. Cl. ........................ 439/196; 439/213; 310/71; 310/52
(58) Field of Search ................................ 439/196, 190, 439/368, 359, 361, 364, 213, 801, 810, 212; 310/71, 68 R, 52

(56) References Cited

U.S. PATENT DOCUMENTS

| 3,183,298 A | * | 5/1965 | Weimer et al. | 439/213 |
| 3,189,680 A | * | 6/1965 | Stanback | 439/213 |
| 3,742,121 A | * | 6/1973 | Schmidt | 174/72 B |
| 4,198,111 A | * | 4/1980 | Cappel | 439/196 |
| 5,011,421 A | * | 4/1991 | Duke et al. | 439/213 |
| 5,229,543 A | * | 7/1993 | Strefling | 174/15.6 |
| 6,146,150 A | * | 11/2000 | Roberts | 439/55 |

* cited by examiner

Primary Examiner—P. Austin Bradley
Assistant Examiner—Ross Gushi

(57) ABSTRACT

A junction assembly has at least one junction and at least one flexible connector. The junction has at least one channel sized and configured to accept and secure at least a portion of a flexible connector relative to the parallel rings and main lead, and at least one coolant passageway through with a coolant can flow to cool the flexible connectors. The flexible connectors are constructed of conductive wire to provide an electrically conductive path and to provide the junction assembly with flexibility. This junction and channel sizing and configuration provides the junction assembly with a modular capability in that one or more flexible connectors can to be positioned in many different ways within the junction.

18 Claims, 5 Drawing Sheets

GENERATOR JUNCTION ASSEMBLY

FIELD OF THE INVENTION

The present invention relates in general to an improved generator junction assembly, and more particularly, to an improved generator parallel ring to main lead junction assembly for use in a turbine generator within a power generation plant.

BACKGROUND OF THE INVENTION

Many power generation plants produce electricity by converting energy (e.g. fossil fuel, nuclear fission, hydraulic head, geothermal heat) into mechanical energy (e.g. rotation of a turbine shaft), and then converting the mechanical energy into electrical energy (e.g. by the principles of electromagnetic induction). Fossil fuel power generation plants typically use a turbine to convert the fossil fuels into mechanical energy and a generator to convert the mechanical energy into electricity.

One aspect of the above-described power generation scheme involves a junction assembly that is located between the generator's parallel rings and the generator's main lead. The junction assembly conducts AC electrical current from the parallel rings to the main lead. The junction assembly must also accept and attenuate the vibration that the parallel rings and coil windings place upon it, as well as withstand the temperatures caused by the electrical current that runs through it.

As shown in FIG. 1, to meet these requirements, a conventional junction assembly 10 typically comprises several flexible connectors 12 (sometimes set back-to-back) secured to a thin, flat elongated junction 14. The flexible connectors 12 are constructed of conductive wire strands 16 to provide an electrically conductive path and to provide the junction assembly 10 with flexibility to accept the various and varying forces and loads applied by the parallel rings 20, main lead 22 and other generator components. The junction 14 secures the flexible connectors 12 relative to the parallel rings 20 and main lead 22, and has a passageway 18 through which a coolant flows to cool the flexible connectors 12 by conduction.

There are several shortcomings, however, to the above-described conventional junction assembly. One shortcoming involves the relatively elongated configuration of the junction assembly. Since electrical current desires to flow toward the perimeter of the junction assembly through a phenomenon known as alternating current (AC) current crowding (where current desires to flow along the ends or perimeter of an object), this elongated configuration undesirably draws current away from the centrally positioned flexible connectors and toward the perimeter of the junction assembly. Also, the junction assembly typically experiences about 20 mils of vibrational force during each of several million cycles, which is greatest toward the perimeter of the junction assembly. Thus, elongated configurations do a poor job in attenuating this vibrational force. Another shortcoming involves the difficulty in attaching and detaching the flexible connectors to the junction and otherwise assembling and disassembling the junction assembly. Another shortcoming involves the need to custom design the junction assembly configuration to accommodate the particular configuration and requirements of the generator with which it is used.

There is thus a need for a junction assembly that inhibits current crowding from the flexible connectors. There is also a need for a junction assembly with improved vibration attenuation. There is also a need for a junction assembly having flexible connectors that can be relatively easily attached and detached to the junction. There is also a need for a junction assembly having a configuration that can be readily modified to accommodate the particular configuration and requirements of the generator with which it is used, such as with different cooling gas and water configurations.

SUMMARY OF THE INVENTION

One aspect of the present invention thus involves a junction assembly, comprising a first electrically conductive junction having at least one channel and at least one coolant inlet and a second electrically conductive junction having at least one channel and at least one coolant outlet; and at least one electrically conductive flexible connector having a first end and a second end, at least a portion of the first end sized and configured to fit within at least a portion of the channel of the first junction and at least a portion of the second end sized and configured to fit within at least a portion of the channel of the second junction. Each of the at least one flexible connector can be secured to the first junction by passing a bolt through a first bolthole in the flexible connector and a bolthole in the first junction, and each of the at least one flexible connector can be secured to the second junction by passing a bolt through a second bolthole in the flexible connector and a bolthole in the second junction.

Another aspect of the present invention involves a junction for use in a generator adapted to connect a main lead with parallel rings, comprising a plurality of channels, each channel having a depth between about 1 inch and about 10 inches and a width between about 0.5 inch and about 2 inches; and at least one coolant avenue that comes within at least about 1 inch of each channel; and at least one bolt hole that intersects the plurality of channels.

Another aspect of the present invention involves a method of securing a plurality of flexible connectors to a junction of a junction assembly used in generator, comprising inserting a least a portion of at least one conductive flexible connector into at least one channel of a conductive junction; aligning a bolt hole in the flexible connector with a bolt hole in the junction; and passing a bolt through the aligned bolt holes and; securing the bolt with a nut.

Further aspects, features and advantages of the present invention will become apparent from the drawings and detailed description of the preferred embodiment that follows.

BRIEF DESCRIPTION OF THE DRAWINGS

The above-mentioned and other concepts of the present invention will now be addressed with reference to the drawings of the preferred embodiments of the present invention. The illustrated embodiments are intended to illustrate, but not to limit the invention. The drawings contain the following figures, in which like numbers refer to like parts throughout the description and drawings and wherein.

DETAILED DESCRIPTION OF THE PREFERRED EMBODIMENT

The invention described herein employs several basic concepts. For example, one concept relates to a compact junction that inhibits AC current crowding from the flexible connectors. Another concept relates to a junction assembly with improved vibration attenuation. Another concept relates to a junction assembly that allows flexible connectors to be easily assembled and disassembled from a junction. Another concept relates to a modular junction assembly capable of use with a variety of generator designs and requirements.

The present invention is disclosed in context of an exemplary generator junction assembly located between a generator's parallel rings and a generator's main lead. The principles of the present invention, however, are not limited to generator junction assemblies located in this particular area, and can be used in connection with other areas within a generator that have similar conductivity, securement, flexibility and/or alignment requirements. It will be understood by one skilled in the art, in light of the present disclosure, that the present invention disclosed herein can also be successfully utilized in connection with junction assemblies outside the generator field and outside the power generation field that have similar conductivity, securement, flexibility and/or alignment requirements. One skilled in the art may also find additional applications for the apparatus, components, configurations and methods disclosed herein. Thus, the illustration and description of the present invention in context of exemplary junction assemblies is merely one possible application of the present invention. However, the present invention has been found particularly suitable in connection with generator junction assemblies.

Figure 1A:
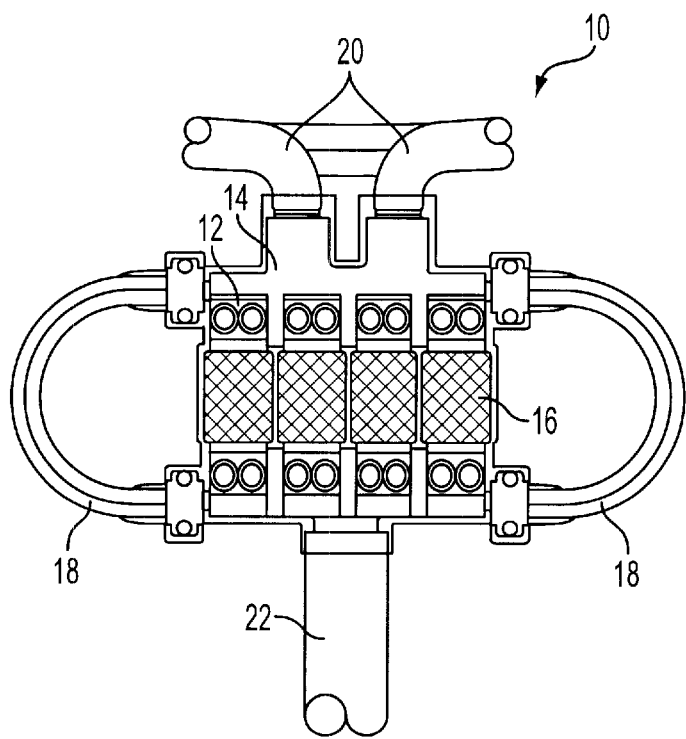
FIG. 1A is a side elevation view of an exemplary prior art generator junction assembly.
Figure 1B:
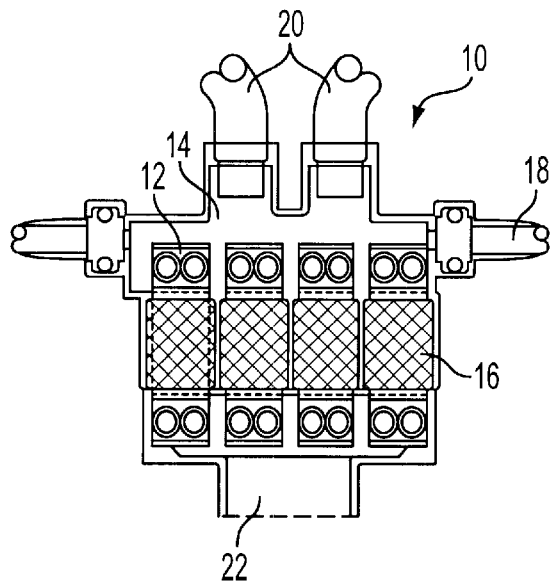
FIG. 1B is a side elevation view of another exemplary prior art generator junction assembly.
Figure 2:
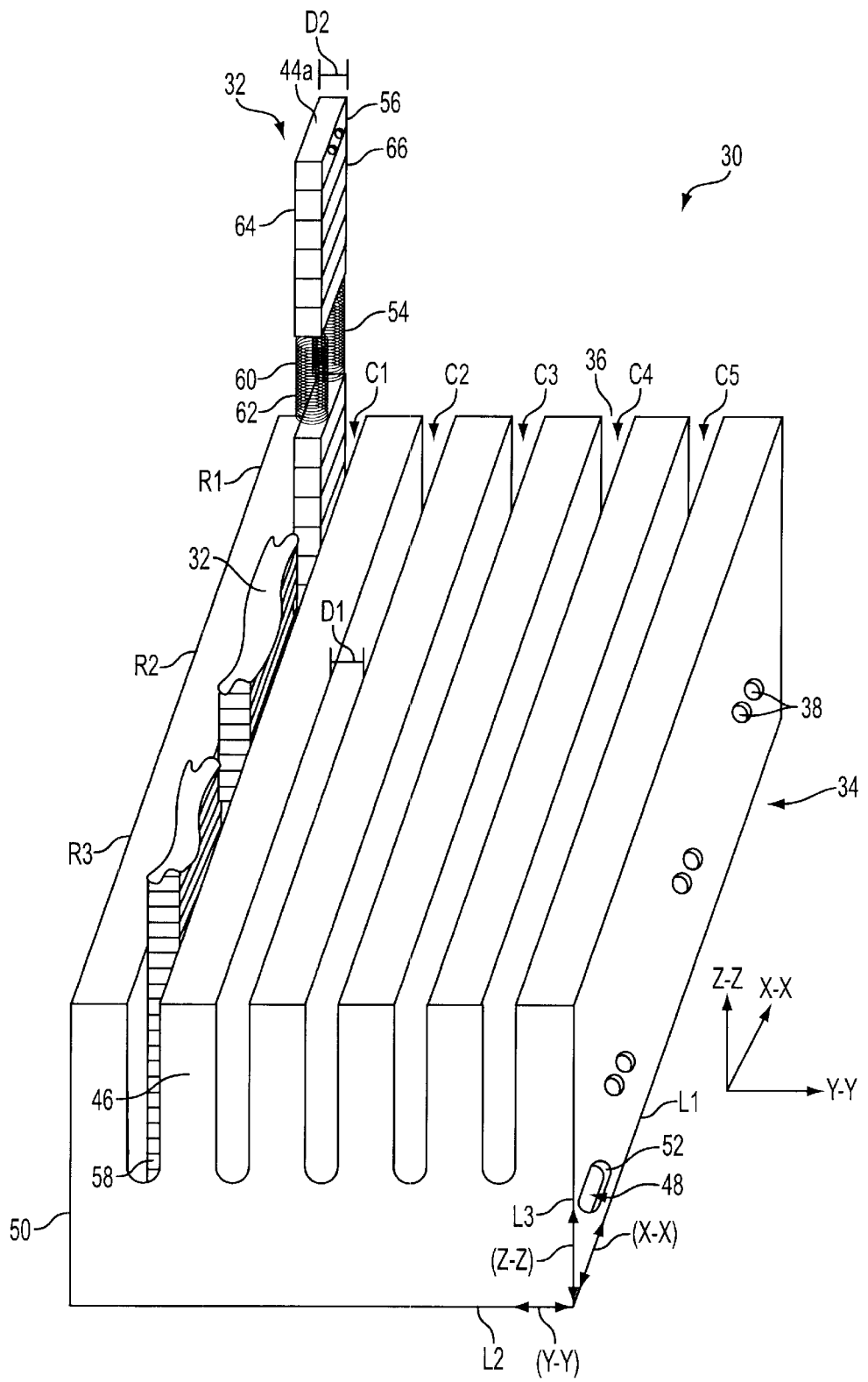
FIG. 2 is a perspective view of a generator junction of the present invention with a plurality of flexible connectors therein.

To assist in the description of the invention described herein, the following terms are used. Referring to FIG. 2, a "longitudinal axis" (X—X) extends along a length of the junction 34. A "lateral axis" (Y—Y) extends along another length of the junction 34. A transverse axis" (Z—Z) extends normal to both the longitudinal and lateral axes, and provides the third or depth dimension of the junction 34. In addition, as used herein, the "longitudinal direction" or "longitudinal length" refers to a direction substantially parallel to the longitudinal axis, the "lateral direction" or "lateral length" refers to a direction substantially parallel to the lateral axis, and the "transverse direction" or "transverse length" refers to a direction substantially parallel to the transverse axis.

FIG. 2 shows a junction assembly 30 comprising at least one flexible connector 32 and a junction 34 located between a generator's parallel rings 20 and a generator's main lead 22. The junction 34 advantageously has a generally compact or condensed shape and not a generally thin, flat, elongated or dispersed shape. This generally compact or condensed shape assists in dispersing the electrical current more evenly along the entire shape of the junction 34, rather than assisting in the natural gravitation of the electrical current toward the perimeter of the junction 34 shape through the AC current crowding phenomena. As explained in more detail below, by using this generally compact or condensed shape and by arranging the flexible connectors 32 throughout this shape and preferably toward the perimeter of this shape, electrical current is inhibited from being drawn away from the flexible connectors 32.

The generally compact and condensed junction 34 shape has a three dimensional shape that can be embodied in a variety of ways, such as cubical, parallelepiped, prism, cylindrical, spherical, ovoid, discuss, conical, pyramidal, truncations and slices thereof and the like. The exemplary illustrated embodiment shows the junction 34 having a generally extended cubical shape.

The illustrated generally extended cubically shaped junction 34 has a longitudinal (X—X) length L1 of about 2 inches to about 40 inches, preferably about 5 inches to about 20 inches and more preferably about 8 inches to about 12 inches. The junction 34 has a lateral (Y—Y) length L2 of about 1 inch to about 20 inches, preferably about 2.5 inches to about 10 inches and more preferably about 4 inches to about 6 inches. The junction 34 has a transverse (Z—Z) length L3 of about 1 inch to about 20 inches, preferably about 3 inches to about 12 inches and more preferably about 4 inches to about 7 inches. However, the lengths L1, L2, L3 could be greater or less depending on the particular junction 34 application. Also, the longitudinal and lateral lengths L1, L2 could be switched such that the lateral length L2 is greater than (or the same as) the longitudinal length L1.

Still referring to FIG. 2, the exemplary illustrated embodiment shows the junction having five channels 36 that each symmetrically extend the entire longitudinal length L1 of the junction 34. The channels 36 are advantageously arranged in columns C1, C2, C3, C4, C5 throughout the junction 34 shape and not only toward the center of this shape, so that electrical current is not unsuitably drawn away from the flexible connectors 32 when positioned within the channels 36. The junction 34, however, need only have one or more channels 36, and preferably has a plurality of channels, more preferably 2–20 channels, and most preferably 4–8 channels to accommodate a plurality of flexible connectors 32. Also, each channel 36 need not extend the entire longitudinal length L1 of the junction 34, but rather need only extend along least a portion of the junction 34. Further, although the illustrated embodiment shows the channels 36 symmetrically arranged about the longitudinal, lateral and/or transverse lengths L1, L2, L3 of the junction 34, the channels 36 need not be arranged along any particular dimension (e.g. L1, L2, L3), need not be arranged in a columnar or symmetrical manner, and need not be arranged in any geometric pattern at all. For example, the channels 36 can be arranged in a random manner about the junction 34 shape, or arranged as a series of slots or holes within the junction 34 into which one or more flexible connectors 32 can be slid.

The channels 36 provide a space within which at least a portion of at least one flexible connector 32 can be placed within and secured to the junction 34. Each channel 36 is advantageously sized and configured so that the portion of the flexible connector 32 can be relatively easily hand-slid therein and remain relatively snug therein. Each channel 36 is thus advantageously sized and configured to have at least a portion with a dimension D1 that is slightly larger (i.e. about 0.001 inch to about 0.5 inch, preferably about 0.005 inch to about 0.1 inch) than a dimension D2 of the portion of the flexible connector 32 to be positioned within the channel 36. Alternatively, the junction 34 could have a preset channel dimension D1, and the portion of the flexible connector 32 to be positioned within the channel 36 could have a dimension D2 that is slightly smaller than the channel 36 dimension D1. The channel 36 advantageously has a depth of about 10% to about 95%, preferably about 30% to about 70%, of the transverse (Z—Z) length L3 of the junction 34.

Still referring to FIG. 2, the exemplary illustrated embodiment shows three flexible connectors 32 disposed within and generally evenly dispersed along the longitudinal length L1 of a channel 36 (C1), thereby arranging the flexible connectors 32 in rows R1, R2, R3 with respect to the channel 36 columns C1–C5. This row-wise arrangement helps provide an easy way to attach and detach the flexible connectors 32 to the junction 34 via bolts 70, as explained in more detail below. Each channel 36, however, need only accept one or more flexible connectors 32, preferably a plurality of flexible connectors, more preferably 2–15 flexible connectors, and most preferably 3–9 flexible connectors, and not all channels 36 need to be occupied by a flexible connector 32. For example, one flexible connector 32 can be positioned toward each of the four corners of the junction 34 (e.g., column-row positions C1R1, C1R3, C5R1, C5R3). For another example, flexible connectors 32 can be positioned along the entire periphery of the junction 34 (e.g., column-row positions C1R1, C1R2, C1R3, C2R3, C3R3, C4R3, C5R3, C5R2, C5R1, C4R1, C3R1, C2R1). Also, the flexible connectors 32 within each channel 36 need not be generally evenly dispersed along the longitudinal length L1 of the channel 36 and no row-wise, symmetrical or geometric arrangement is required.

The above-described junction 34 and channel 36 sizing and configuration provides the junction assembly 30 with a modular capability. That is, the capability of one or more flexible connectors 32 to be positioned in different ways within the junction 32, thereby allowing the junction assembly 30 to adapt to and meet the particular conductivity, securement, flexibility and/or alignment requirements of a variety of different generators. Still referring to FIG. 2, the junction 34 advantageously has at least one bolthole 38 or other fastening mechanism to assist in securing the flexible connectors 32 once inserted into the channels 36. The bolt holes 38 are preferably positioned generally perpendicular to the channel 36 columns C1–C5 for ease of manufacture and use, and preferably at least one bolt hole 38 (two shown) extends along each potential row R1–R3 of flexible connectors 32. However, other configurations can also be used so long as the bolthole 38 can perform its intended function. These configurations, as explained in more detail below, allow the boltholes 38 to be aligned with boltholes 66 in the flexible connectors 32 so that one ore more bolts 70 can be passed therethrough to secure the flexible connectors 32 to the junction 34.

Figure 4:
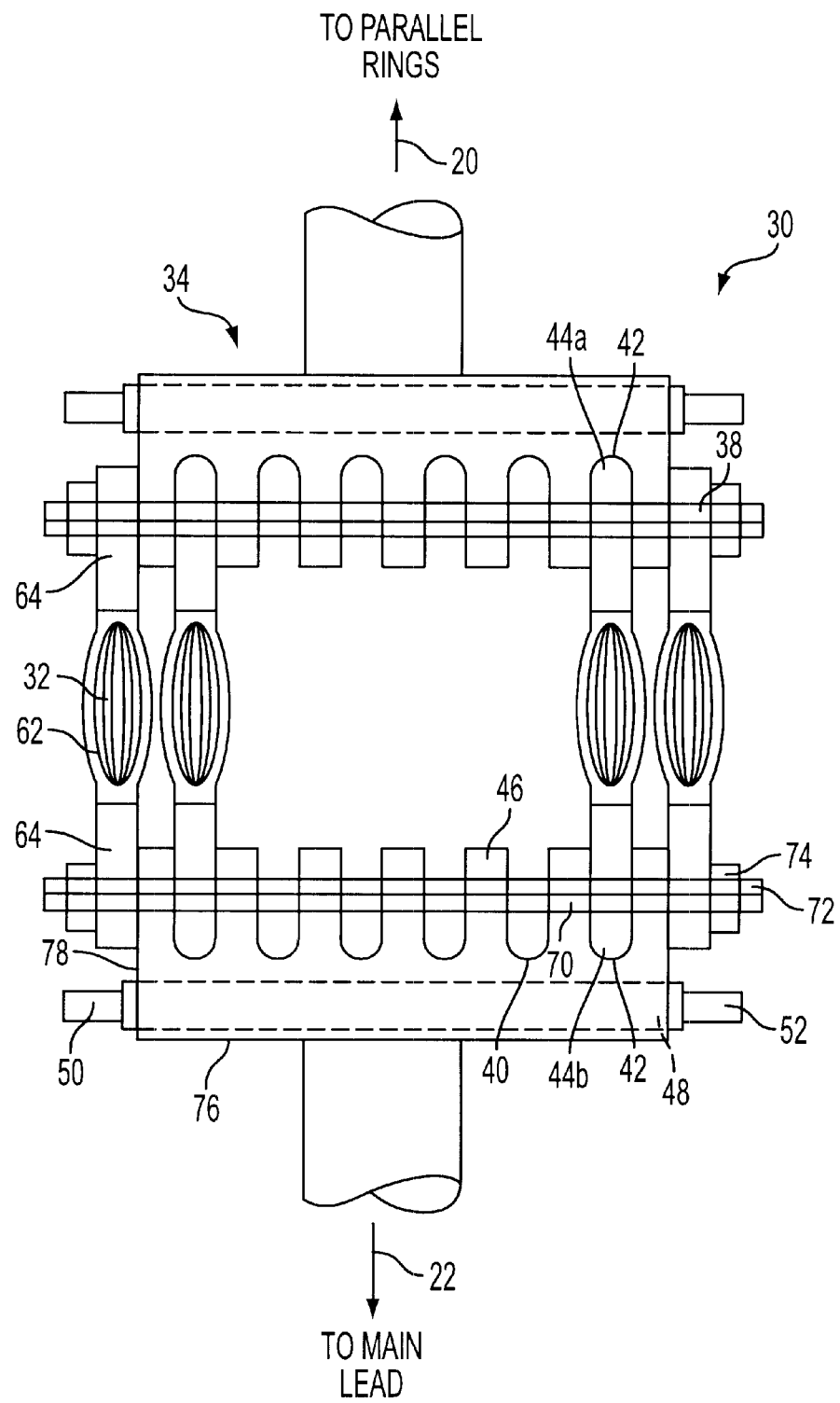
FIG. 4 is a front elevation view of a generator junction assembly of the present invention comprising a pair of exemplary junctions securing a plurality of flexible connectors therebetween.

Referring to FIGS. 2 and 4, a gap 40 exits between the channel bottom 42 and an end 44a, 44b of the flexible connector 32 when the flexible connector 32 is fully slid into the channel 36. The gap 40 provides ease of assembly when sliding the flexible connectors 32 into the channels 36 and when bolting the flexible connectors 32 to the junction 34 by providing some flexibility to the channel protuberances 46 (i.e. allows the protuberances 46 to bend at least about 1°, preferably about 5° to about 20°). The gap 40 can be created in a variety of ways. For example, it can be created by configuring the channel 36 with a nonlinear bottom, preferably generally curved or curvilinear, as show in FIG. 2. For another example, it can be created by forming a notch or recess into the protuberances 46. For another example, it can be created by configuring the channel bottom 42 with a different geometry than the flexible connector 32 ends 44a, 44b. Preferably, the gap 40 is reduced or eliminated once the flexible connectors 32 are secured by the bolts 70.

The illustrated embodiment shows the junction having at least one passageway 48 with an inlet 50 and an outlet 52 to direct a flow of cooling fluid (e.g. air, hydrogen, water sourced from a supply plenum) therethrough to cool the flexible connectors 32 and junction 34. For ease of construction, the illustrated passageways 48 have a generally cylindrical or elliptical shape. The passageways 48 are advantageously sized and configured to perform the cooling function, with at least a portion of at least one passageway 48 nearing each flexible connector 32, preferably coming within about 2 inches of each flexible connector and most preferably coming within about 1 inch of each flexible connector to help ensure sufficient cooling. Each passageway 48 can have a variety of cross-sectional shapes, such as fin-shaped, linear, curved, curvilinear, combinations thereof and the like, and can have an overall path than is linear, curved, curvilinear, combinations thereof and the like. When considering the location of the passageways 48, the inlets 50 and the outlets 52 (or "avenues"), consideration should be taken that the flexible connectors 32 are not be placed so close together that they collectively generate more heat than the coolant can handle.

The coolant, however, need not cool the flexible connectors 32 by conduction, and the junction assembly 30 could be modified to allow the coolant to cool the flexible connectors 23 more efficiently and uniformly by radiation and/or convection. For example, a casing (not shown) having inlet(s) and outlet(s) could surround the junction assembly 30. By this configuration, the coolant could flow into the casing via the inlet and cool the flexible connectors by radiation as well as conductive and/or convention, and then exit the casing via the outlet.

Figure 3:
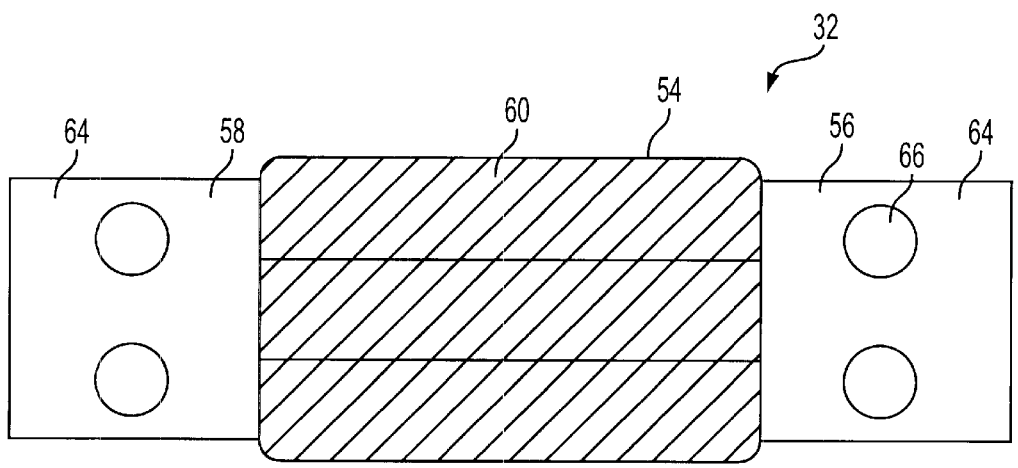
FIG. 3 is a front elevation view of a flexible connector of the present invention.

Referring to FIG. 3, as explained above, the junction assembly 30 includes at least a portion of at least one flexible connector 32 adapted to fit within at least a portion of a junction 34 channel 36 so that electrical connectivity can be achieved between the flexible connector 32 and the junction 34. The flexible connector 32 can be sized and configured in a variety of ways to achieve this function. For example, the illustrated embodiment shows the flexible connector 32 comprising a plurality of conductive ropes 54 (3 shown) having a first end 56 and a second end 58. The exemplary ropes 54 are formed from a plurality of conductive coils 60 that are twisted, wrapped, braided and/or interleaved for strength, cohesiveness or other purposes. Each coil 60, in turn, is formed from a plurality of conductive wire strands (not shown) that are twisted, wrapped, braided, and/or interleaved. The plurality of strands preferably range from about 2 to about 1000, more preferably from about 50 to about 200. The plurality of coils 60 preferably range from about 2 to about 50, more preferably from about 4 to about 20. The plurality of ropes 54 preferably range from about 2 to about 50, more preferably from about 4 to about 20 and may be stacked behind each other. Also, the wire strands (e.g. copper) can be coated with an element such as tin, zinc or silver to inhibit oxidation.

The ends 44a, 44b of the flexible connector 32 can be plated or capped with a conductive sheet 64, such as tin, zinc or silver, to inhibit oxidation and fraying and also to assist in securing the flexible connector 32 to the junction 34. The caps 64 can be compressed such that the capped wire ends 44a, 44b appear and function as a solid conductive element rather than a plurality of wire strands 62. At least one bolthole 66 (2 shown) is advantageously arranged through the caps 64 and sized and configured to generally match and align with the bolt hole(s) 38 in the junction 34 channel 36 such that a bolt 70 can pass therethrough. Also, at least one hole (not shown) may also be arranged through the caps 64 and sized and configured to generally match and align with the coolant passageway 48 in the junction 34 such that the coolant can pass therethrough to cool the flexible connector 32.

One skilled in the art with recognize that the flexible connectors 32 can each be embodied in a variety of other ways to perform its function. For example, each flexible conductor 32 can comprise a single conductive strand 62, coil 60, or rope 54, or can compose one or more conductive sheets with braised or otherwise attached ends.

Referring to FIG. 4, a pair of junctions 34 each having six channels 36 is show securing a plurality of flexible connectors 32 to form a junction assembly 30. One junction 34 is adapted to connect with the parallel rings 20 and one junction 34 is adapted to connect with the main lead 22. A plurality of flexible connectors 32, (e.g., 2) are positioned within the outermost channel 36 columns Cl, C6 of the junctions 34 and a plurality of flexible connectors 32 (e.g., 2) are positioned to abut the exterior 78 of the junctions 34. This configuration arranges the flexible connections 32 near the perimeter to address the AC current crowding phenomena.

Figure 5:
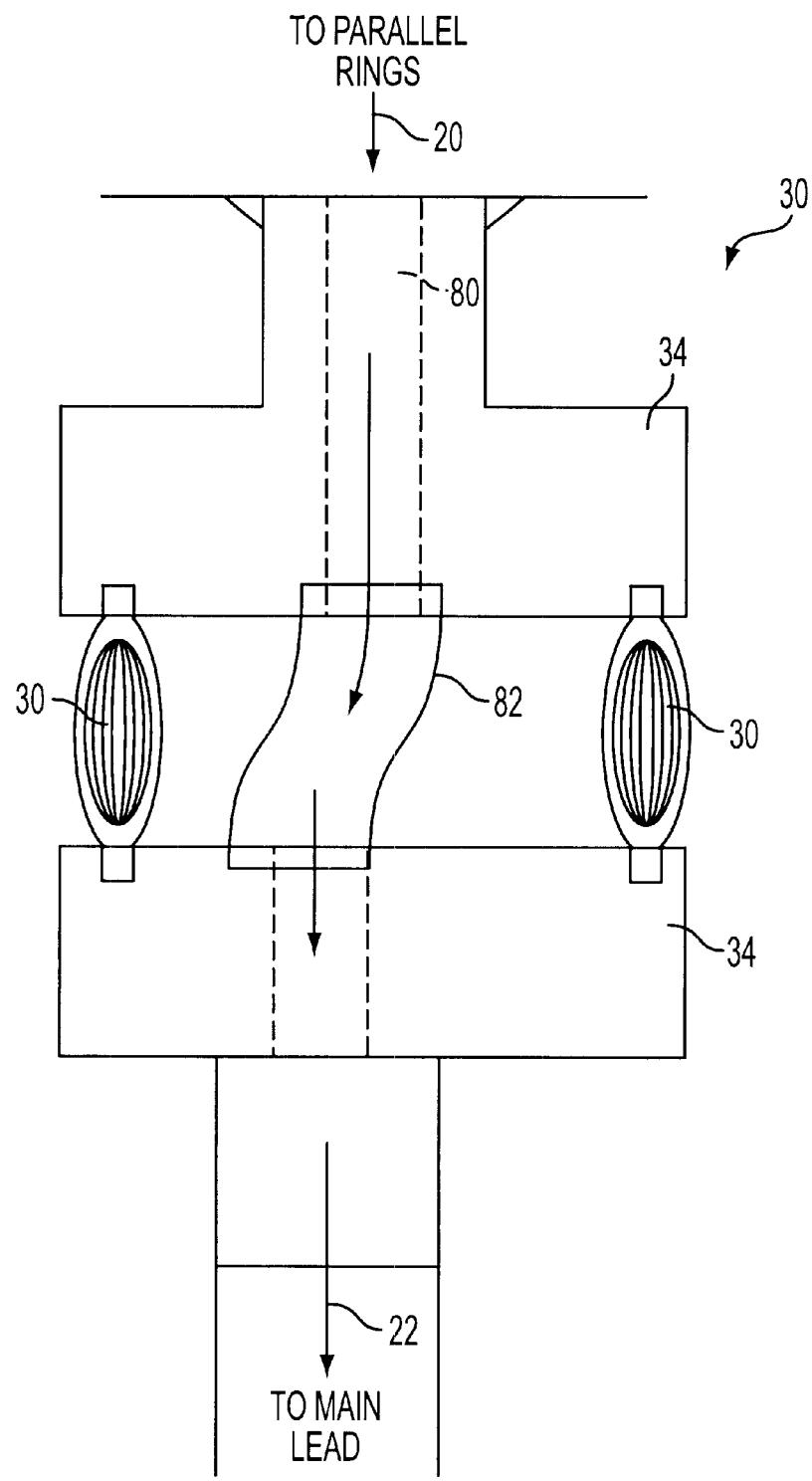
FIG. 5 is a front elevation view of another embodiment of a generator junction assembly of the present invention comprising a pair of exemplary junctions securing a plurality of flexible connectors and a flexible tube therebetween.

FIG. 5 shows another exemplary embodiment of the present invention. Referring to FIG. 5, and like the embodiment of FIG. 4, a pair of junctions 34 are connected by a plurality of flexible connectors 32. A passageway 80 extends through the junctions 34 and is connected by a flexible tube 82. Coolant can them flow through the passageway 80 and tube 82 to further cool the flexible connectors 32 and junction 34.

The passageway 80 and tube 82 are advantageously arranged toward the center of the junction assembly 30 so that the flexible connectors 32 can be located toward the perimeter of the junction 34 where the AC current desires to flow. Of course, a plurality of passageways 80 and/or a plurality of tubes 82 can be used with this embodiment.

Method of Assembly and Disassembly

The exemplary junction assembly 30 can be assembled and disassembled in a variety of ways. For example, to assembly the junction assembly 30, an end 44a, 44b of the flexible connector 32 can be slid into the junction 34 channel 36 so that the boltholes 66 in the flexible connector 32 align with the boltholes 38 in the junction 34. The flexibility in the protuberances 46 can provide "give" to junction 34 which helps ease the sliding of the flexible connector 32 into the channel 36 and helps ease the alignment of the boltholes 38, 66. As explained above, more than one flexible connector 32 can be so slid and aligned, depending on the particular generator configuration and junction assembly 30 requirements. As also explained above, the modular capability of the flexible connectors 32 and the channels 36 allows the junction assembly 30 to be arranged in many ways and thereby easily used with generators having different designs and requirements.

Once the desired number of flexible connectors 32 have been suitably arranged within the channels, a bolt 70 can then be passed through the boltholes 38, 66 in the flexible connectors 32 and junction 34. A nut 72, such as a lock nut, can then be screwed onto the bolt 70 to secure the flexible connector 32 to the junction 34. A washer 74, such as a spring washer, can also be used to help keep the nut 72 and bolt 70 tight when in service.

The other end 44a, 44b of the flexible connectors 32 can then be secured to another junction 34 in a similar manner. To disassemble this exemplary junction assembly 30, one only needs to loosen and remove the bolts 70.

Although FIGS. 2 and 4 show one coolant passageway 48 arranged parallel to the boltholes 70 and between an end 44a, 44b of the flexible connector 32 and an end 76 of the junction 34, as explained above, the passageway 48 can extend into the junction 34 protrusions 46 or other portions of the junction 34 to further assist in cooling the flexible connectors 32. Also, a plurality of coolant passageways can be used.

Although this invention has been described in terms of certain exemplary uses, preferred embodiments, and possible modifications thereto, other uses, embodiments and possible modifications apparent to those of ordinary skill in the art are also within the spirit and scope of this invention. It is also understood that various aspects of one or more features of this invention can be used or interchanged with various aspects of one or more other features of this invention. Accordingly, the scope of the invention is intended to be defined only by the claims that follow.

What is claimed is:

1. A junction assembly, comprising:
   a first electrically conductive junction having at least one channel and at least one coolant inlet and a second electrically conductive junction having at least one channel and at least one coolant outlet; and
   at least one electrically conductive flexible connector having a first end and a second end, at least a portion of the first end sized and configured to fit within at least a portion of the channel of the first junction and at least a portion of the second end sized and configured to fit within at least a portion of the channel of the second junction,
   wherein each of the at least one flexible connector can be secured to the first junction by passing a bolt through a first bolthole in the flexible connector and a bolthole in the first junction, and each of the at least one flexible connector can be secured to the second junction by passing a bolt through a second bolthole in the flexible connector and a bolthole in the second junction.

2. The junction assembly of claim 1, wherein the first and second junctions have a generally compact shape.

3. The junction assembly of claim 2, wherein the first and second junctions each have at least four symmetrical channels that extend along the entire longitudinal length of the junction.

4. The junction assembly of claim 1, wherein the flexible connector comprises a plurality of conductive wire strands.

5. The junction assembly of claim 4, wherein the wire strands are arranged to form a plurality of coils and the plurality of coils are arranged to form a plurality of ropes.

6. The junction assembly of claim 5, wherein the first and second ends of the flexible connector are plated with a conductive sheet constructed of tin, zinc or silver.

7. The junction assembly of claim 1, wherein a plurality of bolt holes are located on the first end of the flexible connector and another plurality of boltholes are located on the second end of the flexible connector.

8. A junction for use in a generator adapted to connect a main lead with parallel rings, comprising:
   a plurality of channels, each channel having a depth between about 1 inch and about 10 inches and a width between about 0.5 inch and about 2 inches; and
   at least one coolant avenue that comes within at least about 1 inch of each channel; and
   at least one bolt hole that intersects the plurality of channels.

9. The junction of claim 8, wherein the junction has a generally compact shape.

10. The junction of claim 9, wherein the shape of the junction has a generally extended cubical shape.

11. The junction of claim 8, wherein each channel is sized and configured to accept at least a portion of a flexible connector.

12. The junction of claim 11, wherein each channel is sized and configured to accept a portion of at least three flexible connectors, the at least three flexible connectors capable of being arranged in three rows that extend parallel to the channels.

13. The junction of claim 12, wherein at least four channels extend along the entire longitudinal length of the junction and are arranged substantially parallel to each other.

14. The junction of claim 8, wherein the bottom of each channel is curved.

15. The junction of claim 8, wherein the coolant passageway runs linear and perpendicular to the channels.

16. The junction of claim 8, wherein each bolthole runs substantially perpendicular to each channel.

17. A method of securing a plurality of flexible connectors to a junction of a junction assembly used in generator, comprising inserting a least a portion of at least one conductive flexible connector into at least one channel of a conductive junction;

aligning a bolt hole in the flexible connector with a bolt hole in the junction; and passing a bolt through the aligned bolt holes and;

securing the bolt with a nut wherein a coolant passageway extends through a portion of the junction and through a void in the flexible connector.

18. The method of claim 17, wherein the bolt hole in the junction extends through a plurality of channels in the junction.

* * * * *